(12) United States Patent
Carnevali et al.

(10) Patent No.: US 12,158,776 B2
(45) Date of Patent: Dec. 3, 2024

(54) DOCKS FOR MOBILE DEVICES WITH SIMULTANEOUS DATA TRANSFER AND CHARGING AND SYSTEMS AND METHODS USING THE DOCKS

(71) Applicant: National Products, Inc., Seattle, WA (US)

(72) Inventors: Jeffrey D. Carnevali, Seattle, WA (US); Scott Anderson, Seattle, WA (US)

(73) Assignee: National Products, Inc., Seattle, WA (US)

(*) Notice: Subject to any disclaimer, the term of this patent is extended or adjusted under 35 U.S.C. 154(b) by 0 days.

(21) Appl. No.: 17/728,774

(22) Filed: Apr. 25, 2022

(65) Prior Publication Data

US 2023/0341897 A1 Oct. 26, 2023

(51) Int. Cl.
*G06F 1/16* (2006.01)

(52) U.S. Cl.
CPC .................... *G06F 1/1632* (2013.01)

(58) Field of Classification Search
CPC ...................................... G06F 1/1632
See application file for complete search history.

(56) References Cited

U.S. PATENT DOCUMENTS

| 809,977 A | 1/1906 | O'Brien |
|---|---|---|
| 1,786,459 A | 7/1926 | Simons |
| 2,495,552 A | 1/1950 | Schmitz |

(Continued)

FOREIGN PATENT DOCUMENTS

| CN | 1312603 | 9/2001 |
|---|---|---|
| CN | 101674096 | 3/2010 |

(Continued)

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Rockshana D Chowdhury
(74) *Attorney, Agent, or Firm* — Branch Partners PLLC; Bruce E. Black

(57) ABSTRACT

A dock for a mobile device includes a housing; a mobile device connector disposed at least partially within the housing; a power source connector for coupling a power source to the dock, wherein the power source connector is electrically coupled to the mobile device connector; a controller disposed in the housing for facilitating data transfer between the mobile device and a data device, wherein the controller is electrically coupled to the mobile device connector; a data device connector for coupling the data device to the dock, wherein the data device connector is electrically coupled to the controller; wherein the controller, data device connector, power source connector, and mobile device connector are configured for simultaneously providing data transfer between the mobile device and the data device and charging the mobile device using the power source with a charging current of at least 1 Amp.

20 Claims, 5 Drawing Sheets

(56) References Cited

U.S. PATENT DOCUMENTS

| | | |
|---|---|---|
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 7/1986 | Hancock |
| 4,828,558 A | 5/1989 | Kelman |
| 4,842,174 A | 6/1989 | Sheppard et al. |
| 4,848,319 A | 7/1989 | Appeldorn |
| 5,002,184 A | 3/1991 | Lloyd |
| 5,096,317 A | 3/1992 | Phillippe |
| 5,135,189 A | 8/1992 | Ghazizadeh |
| 5,246,133 A | 9/1993 | James |
| 5,272,771 A | 12/1993 | Ansell et al. |
| 5,295,602 A | 3/1994 | Swanson |
| 5,353,934 A | 10/1994 | Yamauchi |
| 5,457,745 A | 10/1995 | Wang |
| 5,535,274 A | 7/1996 | Braitberg et al. |
| 5,584,054 A | 12/1996 | Tyneski et al. |
| 5,586,002 A | 12/1996 | Notarianni |
| 5,641,065 A | 6/1997 | Owens et al. |
| 5,646,649 A | 7/1997 | Iwata et al. |
| 5,791,506 A | 8/1998 | Sheffler et al. |
| 5,813,096 A | 9/1998 | Soennichsen |
| 5,822,427 A | 10/1998 | Braitberg et al. |
| 5,842,670 A | 12/1998 | Nigoghosian |
| 5,845,885 A | 12/1998 | Carnevali |
| 5,860,550 A | 1/1999 | Miller et al. |
| 5,888,087 A | 3/1999 | Hanson et al. |
| 5,895,018 A | 4/1999 | Rielo |
| 5,953,795 A | 9/1999 | Bauer |
| 5,969,057 A | 10/1999 | Schoeley et al. |
| 5,990,874 A | 11/1999 | Tsumura et al. |
| 5,992,807 A | 11/1999 | Tarulli |
| 6,009,601 A | 1/2000 | Kaufman |
| 6,010,005 A | 1/2000 | Reames et al. |
| 6,032,910 A | 3/2000 | Richter |
| 6,034,505 A | 3/2000 | Arthur et al. |
| 6,035,800 A | 3/2000 | Clifford |
| 6,043,626 A | 3/2000 | Snyder et al. |
| 6,068,119 A | 5/2000 | Derr et al. |
| 6,149,116 A | 11/2000 | Won |
| 6,191,943 B1 | 2/2001 | Tracy |
| 6,229,893 B1 | 5/2001 | Chen |
| 6,273,773 B1 | 8/2001 | Bourke |
| 6,276,552 B1 | 8/2001 | Vervisch |
| 6,295,198 B1 | 9/2001 | Loh et al. |
| 6,341,218 B1 | 1/2002 | Poplawsky et al. |
| 6,356,053 B1 | 3/2002 | Sandoz et al. |
| 6,377,825 B1 | 4/2002 | Kennedy et al. |
| 6,392,882 B1 | 5/2002 | Chen et al. |
| 6,406,758 B1 | 6/2002 | Bottari et al. |
| 6,407,860 B1 | 6/2002 | Funazaki et al. |
| 6,438,229 B1 | 8/2002 | Overy et al. |
| 6,561,476 B2 | 5/2003 | Carnevali |
| 6,572,176 B2 | 6/2003 | Davies et al. |
| 6,585,212 B2 | 7/2003 | Carnevali |
| 6,588,637 B2 | 7/2003 | Gates et al. |
| 6,597,924 B1 | 7/2003 | Smith |
| 6,614,423 B1 | 9/2003 | Wong et al. |
| 6,646,864 B2 | 11/2003 | Richardson |
| 6,648,376 B2 | 11/2003 | Christianson |
| 6,687,516 B2 | 2/2004 | Chen |
| 6,702,604 B1 | 3/2004 | Moscovitch |
| 6,754,343 B2 | 6/2004 | Lundstrom et al. |
| 6,762,585 B2 | 7/2004 | Liao |
| 6,776,422 B1 | 8/2004 | Toy |
| 6,785,566 B1 | 8/2004 | Irizarry |
| 6,785,567 B2 | 8/2004 | Kato |
| 6,816,713 B2 | 11/2004 | Chen |
| 6,842,171 B2 | 1/2005 | Richter et al. |
| 6,953,126 B2 | 10/2005 | Parker et al. |
| 6,984,680 B2 | 1/2006 | Quinn |
| 6,995,976 B2 | 2/2006 | Richardson |
| 7,017,243 B2 | 3/2006 | Carnevali |
| 7,031,148 B1 | 4/2006 | Lin |
| 7,068,783 B2 | 6/2006 | Peiker |
| 7,158,376 B2 | 1/2007 | Richardson et al. |
| 7,180,735 B2 | 2/2007 | Thomas et al. |
| 7,203,058 B2 | 4/2007 | Hong |
| 7,230,823 B2 | 6/2007 | Richardson et al. |
| 7,236,356 B2 | 6/2007 | Ulla et al. |
| 7,248,901 B2 | 7/2007 | Peiker |
| 7,257,429 B2 | 8/2007 | Kogan |
| 7,283,849 B2 | 10/2007 | Peiker |
| 7,311,526 B2 | 12/2007 | Rohrbach et al. |
| 7,312,984 B2 | 12/2007 | Richardson et al. |
| 7,320,450 B2 | 1/2008 | Carnevali |
| 7,329,128 B1 | 2/2008 | Awad |
| 7,351,066 B2 | 4/2008 | DiFonzo et al. |
| 7,430,674 B2 * | 9/2008 | von Mueller ......... G06F 1/1632 |
| | | 713/320 |
| 7,464,814 B2 | 12/2008 | Carnevali |
| 7,480,138 B2 | 1/2009 | Kogan et al. |
| 7,481,664 B1 | 1/2009 | Knoll et al. |
| 7,517,222 B2 | 4/2009 | Rohrbach et al. |
| 7,520,389 B2 | 4/2009 | Lalouette |
| 7,551,458 B2 | 6/2009 | Carnevali |
| 7,566,224 B2 | 7/2009 | Wu |
| 7,573,706 B2 | 8/2009 | Carnevali |
| 7,594,576 B2 | 9/2009 | Chen et al. |
| 7,609,512 B2 | 10/2009 | Richardson et al. |
| 7,612,997 B1 | 11/2009 | Diebel et al. |
| 7,625,212 B2 | 12/2009 | Du |
| 7,641,477 B2 | 1/2010 | DiFonzo et al. |
| 7,645,143 B2 | 1/2010 | Rohrbach et al. |
| 7,663,879 B2 | 2/2010 | Richardson et al. |
| 7,688,580 B2 | 3/2010 | Richardson et al. |
| 7,775,801 B2 | 8/2010 | Shiff et al. |
| 7,812,567 B2 | 10/2010 | Shen |
| 7,841,776 B2 | 11/2010 | DiFonzo et al. |
| 7,850,032 B2 | 12/2010 | Carnevali et al. |
| 7,855,529 B2 | 12/2010 | Liu |
| RE42,060 E | 1/2011 | Carnevali |
| 7,889,489 B2 | 2/2011 | Richardson et al. |
| 7,894,180 B2 | 2/2011 | Carnevali |
| 7,901,216 B2 | 3/2011 | Rohrbach et al. |
| 7,907,394 B2 | 3/2011 | Richardson et al. |
| 7,911,779 B1 | 3/2011 | Tarnoff |
| 7,946,891 B2 | 5/2011 | Peiker |
| 7,970,440 B2 | 6/2011 | Bury |
| RE42,581 E | 8/2011 | Carnevali |
| 7,997,554 B2 | 8/2011 | Carnevali |
| 8,061,516 B2 | 11/2011 | Carnevali |
| 8,074,951 B2 | 12/2011 | Carnevali |
| 8,080,975 B2 | 12/2011 | Bessa et al. |
| 8,087,939 B2 | 1/2012 | Rohrbach et al. |
| 8,099,138 B2 | 1/2012 | Piekarz |
| 8,167,624 B2 | 5/2012 | Hartlef et al. |
| 8,172,580 B1 | 5/2012 | Chen et al. |
| 8,177,178 B2 | 5/2012 | Carnevaali |
| 8,177,560 B2 | 5/2012 | Rohrbach et al. |
| 8,179,672 B2 | 5/2012 | Carnevali |
| 8,183,825 B2 | 5/2012 | Sa |
| 8,224,408 B2 | 7/2012 | Tomasini et al. |
| RE43,806 E | 11/2012 | Carnevali |
| 8,390,255 B1 | 3/2013 | Fathollahi |
| 8,405,974 B2 | 3/2013 | Sayavong |
| 8,414,312 B2 | 4/2013 | Hung et al. |
| 8,435,042 B2 | 5/2013 | Rohrbach et al. |
| 8,453,835 B2 | 6/2013 | So |
| 8,454,178 B2 | 6/2013 | Carnevali |
| 8,483,758 B2 | 7/2013 | Huang |
| 8,497,753 B2 | 7/2013 | DiFonzo et al. |
| 8,505,861 B2 | 8/2013 | Carnevali |

(56) References Cited

U.S. PATENT DOCUMENTS

| | | |
|---|---|---|
| 8,560,014 B1 | 10/2013 | Hu et al. |
| 8,634,887 B2 | 1/2014 | Hu et al. |
| 8,639,288 B1 | 1/2014 | Friedman |
| 8,646,698 B2 | 2/2014 | Chen et al. |
| 8,690,582 B2 | 4/2014 | Rohrbach et al. |
| 8,702,316 B2 | 4/2014 | DiFonzo et al. |
| 8,729,854 B2 | 5/2014 | Tsai et al. |
| 8,760,311 B2 | 6/2014 | Heaton |
| 8,763,802 B2 | 7/2014 | Ellis-Brown |
| 8,801,441 B2 | 8/2014 | Zhang et al. |
| 8,825,123 B1 | 9/2014 | Gudino |
| 8,833,716 B2 | 9/2014 | Funk et al. |
| 8,891,800 B1 | 11/2014 | Shaffer |
| 8,894,420 B2 | 11/2014 | Schichl et al. |
| 8,907,783 B2 | 12/2014 | Fish et al. |
| 8,911,246 B2 | 12/2014 | Carnevali |
| 8,929,065 B2 | 1/2015 | Williams |
| 8,950,717 B2 | 2/2015 | Chuang |
| 8,970,332 B2 | 3/2015 | DiFonzo et al. |
| 9,011,184 B2 | 4/2015 | Chen et al. |
| 9,026,187 B2 | 5/2015 | Huang |
| 9,036,343 B2 | 5/2015 | Carnevali |
| 9,071,060 B2 | 6/2015 | Fathollahi |
| 9,072,172 B2 | 6/2015 | Hsu |
| 9,112,304 B2 | 8/2015 | Rohrbach et al. |
| 9,123,935 B2 | 9/2015 | Huang |
| 9,147,966 B2 | 9/2015 | An |
| 9,172,781 B1 | 10/2015 | Goldstein |
| 9,195,279 B2 | 11/2015 | Carnevali et al. |
| 9,201,593 B2 | 12/2015 | Collopy et al. |
| 9,288,295 B2 | 3/2016 | Ivanovski et al. |
| 9,298,661 B2 | 3/2016 | Hamel et al. |
| 9,331,444 B2 | 5/2016 | Carnevali |
| 9,356,267 B1 | 5/2016 | To et al. |
| 9,529,387 B2 | 12/2016 | Carnevali |
| 9,535,457 B1 | 1/2017 | Vier |
| 9,591,113 B2 | 3/2017 | Filser et al. |
| 9,602,639 B2 | 3/2017 | Carnevali |
| 9,632,535 B2 | 4/2017 | Carnevali et al. |
| 9,647,474 B2 | 5/2017 | Fathollahi et al. |
| 9,706,026 B2 | 7/2017 | Carnevali |
| 9,774,713 B2 | 9/2017 | Guerdrum et al. |
| 9,776,577 B2 | 10/2017 | Carnevali |
| 9,807,211 B2 | 10/2017 | Guerdrum et al. |
| 9,809,175 B2 | 11/2017 | Jonik et al. |
| 9,817,441 B1 | 11/2017 | Kuo |
| 9,831,904 B1 | 11/2017 | Carnevali |
| 9,898,041 B2 | 2/2018 | Blowers et al. |
| 9,924,005 B1 | 3/2018 | McElderry |
| 10,050,658 B2 | 8/2018 | Carnevali |
| 10,054,984 B2 | 8/2018 | Carnevali et al. |
| 10,148,104 B2 | 12/2018 | Sa |
| 10,172,246 B2 | 1/2019 | Apter |
| 10,330,251 B2 | 6/2019 | Carnevali |
| 10,389,399 B2 | 8/2019 | Carnevali |
| 10,401,905 B2 | 9/2019 | Carnevali |
| 10,416,715 B1 * | 9/2019 | Wade .................. G06F 1/1632 |
| 10,454,515 B2 | 10/2019 | Carnevali |
| 10,485,312 B2 | 11/2019 | Rodriguez |
| 10,630,334 B2 | 4/2020 | Carnevali |
| 10,656,687 B2 | 5/2020 | Tashiro et al. |
| 10,666,309 B2 | 5/2020 | Carnevali |
| 10,707,632 B1 | 7/2020 | Yamamoto et al. |
| 10,714,953 B1 | 7/2020 | Solana et al. |
| 10,778,275 B2 | 9/2020 | Carnevali |
| 10,788,857 B2 | 9/2020 | Huang et al. |
| 10,812,643 B1 | 10/2020 | Carnevali et al. |
| 10,928,856 B1 * | 2/2021 | Hamlin ................ G06F 1/1601 |
| 10,976,777 B2 | 4/2021 | Pischel |
| 11,029,731 B1 | 6/2021 | Carnevali |
| 11,076,032 B1 | 7/2021 | Carnevali |
| 11,165,458 B2 | 11/2021 | Carnevali |
| 11,277,506 B2 | 3/2022 | Carnevali |
| 11,289,864 B2 | 3/2022 | Carnevali et al. |
| 11,489,350 B2 | 11/2022 | Carnevali |
| 11,522,379 B2 * | 12/2022 | Lee ...................... G06F 1/3275 |
| 11,597,334 B2 | 3/2023 | Telesco et al. |
| 11,619,971 B1 * | 4/2023 | Passe ................ H04M 1/72409 |
| | | 361/679.41 |
| 11,652,326 B2 | 5/2023 | Carnevali |
| 2002/0009194 A1 | 1/2002 | Wong et al. |
| 2002/0032041 A1 | 3/2002 | Hirai et al. |
| 2002/0191782 A1 | 12/2002 | Beger et al. |
| 2003/0068986 A1 | 4/2003 | Oh |
| 2003/0116631 A1 | 6/2003 | Salvato et al. |
| 2004/0108348 A1 | 6/2004 | Barnes |
| 2004/0209489 A1 | 10/2004 | Clapper |
| 2005/0189354 A1 | 9/2005 | Heather et al. |
| 2006/0058073 A1 | 3/2006 | Kim |
| 2006/0175766 A1 | 8/2006 | Carnevali |
| 2007/0127204 A1 | 6/2007 | Muenzer et al. |
| 2008/0104301 A1 * | 5/2008 | Assouad ................ G06F 1/1632 |
| | | 710/303 |
| 2008/0149796 A1 | 6/2008 | Moscovitch |
| 2008/0273734 A1 | 11/2008 | Solland |
| 2009/0021903 A1 | 1/2009 | Chen et al. |
| 2009/0140113 A1 | 6/2009 | Carnevali |
| 2009/0160400 A1 | 6/2009 | Woud |
| 2009/0314400 A1 | 12/2009 | Liu |
| 2010/0013431 A1 * | 1/2010 | Liu ........................ H02J 50/70 |
| | | 320/108 |
| 2011/0143583 A1 | 6/2011 | Zilmer et al. |
| 2012/0018325 A1 | 1/2012 | Kim |
| 2012/0043235 A1 | 2/2012 | Klement |
| 2012/0088558 A1 | 4/2012 | Song |
| 2012/0118773 A1 | 5/2012 | Rayner |
| 2012/0211382 A1 | 8/2012 | Rayner |
| 2012/0250270 A1 | 10/2012 | Liu |
| 2012/0261306 A1 | 10/2012 | Richardson et al. |
| 2012/0298536 A1 | 11/2012 | Rauta et al. |
| 2013/0088188 A1 * | 4/2013 | Romanenko ........ G06F 13/4282 |
| | | 320/107 |
| 2013/0092576 A1 | 4/2013 | Rayner |
| 2013/0106353 A1 | 5/2013 | Foster |
| 2013/0193006 A1 | 8/2013 | Bergreen et al. |
| 2013/0220841 A1 | 8/2013 | Yang |
| 2013/0258573 A1 | 10/2013 | Muday et al. |
| 2013/0273752 A1 | 10/2013 | Rudisill et al. |
| 2013/0273983 A1 | 10/2013 | Hsu |
| 2013/0331156 A1 | 12/2013 | Lui |
| 2013/0334071 A1 | 12/2013 | Carnevali |
| 2014/0042285 A1 | 2/2014 | Carnevali |
| 2014/0055928 A1 * | 2/2014 | Lee ...................... G06F 1/1632 |
| | | 361/679.01 |
| 2014/0059264 A1 * | 2/2014 | Sudak .................. G06F 1/1632 |
| | | 710/303 |
| 2014/0070774 A1 * | 3/2014 | Terlizzi ................ H02J 7/00047 |
| | | 320/137 |
| 2014/0099526 A1 | 4/2014 | Powell et al. |
| 2014/0168885 A1 | 6/2014 | Williams |
| 2014/0347000 A1 | 11/2014 | Hamann et al. |
| 2014/0363988 A1 | 12/2014 | An |
| 2015/0055289 A1 | 2/2015 | Chang et al. |
| 2015/0146401 A1 | 5/2015 | Su et al. |
| 2015/0189780 A1 | 7/2015 | Su et al. |
| 2016/0065702 A1 | 3/2016 | Carnevali |
| 2016/0231779 A1 | 8/2016 | Kaneko et al. |
| 2016/0309010 A1 * | 10/2016 | Carnevali ............. H04M 1/185 |
| 2017/0054312 A1 | 2/2017 | Kuchynka et al. |
| 2017/0227987 A1 | 8/2017 | Carnevali et al. |
| 2018/0279809 A1 | 10/2018 | Regan et al. |
| 2018/0314296 A1 | 11/2018 | Evns, V et al. |
| 2019/0267825 A1 * | 8/2019 | Chien ...................... A47G 1/04 |
| 2020/0195763 A1 | 6/2020 | Ellis ......................... G08B 3/10 |
| 2020/0197563 A1 | 6/2020 | Shen et al. |
| 2020/0326955 A1 * | 10/2020 | Adiletta ................ G06F 1/1684 |
| 2020/0330037 A1 | 10/2020 | Al-Ali et al. |
| 2020/0371555 A1 | 11/2020 | Huang et al. |
| 2021/0048848 A1 | 2/2021 | Pischel |
| 2021/0194256 A1 | 6/2021 | Carnevali |
| 2021/0391678 A1 | 12/2021 | Carnevali |
| 2021/0392773 A1 | 12/2021 | Carnevali |
| 2022/0026951 A1 * | 1/2022 | Wood, III ............. G06F 13/385 |
| 2022/0066505 A1 * | 3/2022 | Lu ........................ G06F 13/122 |

(56) References Cited

U.S. PATENT DOCUMENTS

| | | | |
|---|---|---|---|
| 2022/0253097 A1 | 8/2022 | Carnevali et al. | |
| 2023/0039167 A1* | 2/2023 | Kamepalli | G06F 1/263 |
| 2023/0045485 A1 | 2/2023 | Carnevali et al. | |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| TW | 531119 | 5/2003 |
| TW | M422808 | 2/2012 |
| WO | 2012/052751 | 4/2012 |
| WO | 2013/081222 | 6/2013 |
| WO | 2014/054426 | 4/2014 |
| WO | 2015/022675 | 2/2015 |

OTHER PUBLICATIONS

Officeonthego.com, 3 pages of product description of Magnifico® Plus screen magnifier product information retrieved from web site at: www.officeonthego.com.
2 pages of product information for Armor 1600 and Armor 1601 waterproof, dustproof and airtight protective cases.
2 pages Otterox 4600 Tablet PC Case protective cases product information retrieved from web site at: www.otterbox.com.
Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].
Battery Charging Specification (Including errata and ECNs through Mar. 15, 2012); Revision 1.2, Mar. 15, 2012. 72 pages.

\* cited by examiner

DOCKS FOR MOBILE DEVICES WITH SIMULTANEOUS DATA TRANSFER AND CHARGING AND SYSTEMS AND METHODS USING THE DOCKS

FIELD

The present invention is directed to docks for a mobile device. The present invention is also directed to a dock for a mobile device that allows simultaneous data transfer and host level charging and systems and methods using the dock.

BACKGROUND

Mobile devices, such as smartphones, cellular or mobile phones, tablets, personal data assistants, and other portable devices, are now ubiquitous. Often, when a mobile device (for example, a mobile phone or a tablet) is coupled to a power source for charging, the mobile device is in a "host" mode for host level charging (for example, charging at a current of at least 1, 1.25, 1.5, or 1.65 Amps at the mobile device.) However, when the mobile device is connected to a computer (or other data device) for data transfer, the port of the computer (or other data device) advertises the capabilities of the computer (or other data device) to the mobile device (and vice versa) and the type of port. In this arrangement, the mobile device is given the "client" role and the computer (or other data device) is given the "host" role. In addition to the flow of data, the computer (or other data device) provides, for example, 500 mA to the "client" (i.e., the mobile device.) This is also a common relationship between mobile devices and automotive computers or cameras.

Conventionally, the mobile device can either utilize host level charging or engage in data transfer, but not both simultaneously. Many conventional mobile devices allow OTG (On the Go Mode) charging during data transfer, but this charging occurs at the lower current level (for example, no more than 500 mA at the mobile device,) instead of host level charging (for example, charging with a current of at least 1, 1.25, 1.5, or 1.65 Amps at the mobile device.)

A challenge with this conventional arrangement is that charging at 500 mA is often not sufficient to power a mobile device that is in use. For example, delivery drivers may have the mobile device coupled to a vehicle computer, running multiple applications (for example, navigation, cellular radio, or enterprise applications), and at full brightness. Charging at 500 mA may be insufficient to maintain power in the mobile device over a period of time.

BRIEF SUMMARY

One embodiment is a dock configured to receive a mobile device. The dock includes a housing; a mobile device connector disposed at least partially within the housing and configured for electrically coupling to a mobile device received in the dock; a power source connector configured for coupling a power source to the dock, wherein the power source connector is electrically coupled to the mobile device connector; a controller disposed in the housing and configured for facilitating data transfer between the mobile device and a data device, wherein the controller is electrically coupled to the mobile device connector; a data device connector configured for coupling the data device to the dock, wherein the data device connector is electrically coupled to the controller; wherein the controller, data device connector, power source connector, and mobile device connector are configured for simultaneously providing data transfer between the mobile device and the data device and charging the mobile device using the power source with a charging current of at least 1 Amp at the mobile device.

In at least some embodiments, the power source connector is not electrically coupled to the controller. In at least some embodiments, the controller has a LED driver pin and the dock further includes a resistor electrically coupled to the LED driver pin. In at least some embodiments, the controller has a 3.3 voltage power output pin and the LED driver pin is electrically coupled to the 3.3 voltage power output pin through the resistor.

In at least some embodiments, the dock further includes a first dock cable extending from the housing and coupled to the power source connector. In at least some embodiments, the dock further includes a second dock cable extending from the housing and coupled to the data device connector.

In at least some embodiments, the controller is a USB port hub controller. In at least some embodiments, the mobile device connector is any type of USB connector. In at least some embodiments, the mobile device connector is not a USB connector.

Another embodiments is a mobile device docking system that includes any of the docks described above and the mobile device receivable in the dock, the mobile device including a connector electrically coupleable to the mobile device connector of the dock.

In at least some embodiments, the mobile device docking system further includes the power source coupleable to the power source connector of the dock. In at least some embodiments, the mobile device docking system further includes the data device coupleable to the data device connector of the dock. In at least some embodiments, the mobile device connector is a type of connector that is directly connectable to the connector of the mobile device.

In at least some embodiments, the mobile device docking system further includes a cover, wherein the mobile device is receivable within the cover. In at least some embodiments, the cover includes an adapter, the adapter including a connector configured for electrically connecting to the connector of the mobile device and a contactor having contacts disposed thereon and configured for electrically connecting to the mobile device connector of the dock. In at least some embodiments, the mobile device connector is a type of connector that is not directly connectable to the connector of the mobile device. In at least some embodiments, the connector of the adapter of the cover and the connector of the mobile device are USB connectors.

Yet another embodiments is a method of using a mobile device that includes receiving the mobile device in any of the docks described above; coupling a data device to the data device connector of the dock; and transferring data between the data device and the mobile device using the controller of the dock.

In at least some embodiments, the method further includes coupling a power source to the power source connector of the dock and charging the mobile device via the dock using the power source. In at least some embodiments, the method further includes simultaneously transferring the data between the data device and the mobile device using the controller of the dock and charging the mobile device via the dock using the power source with the charging current of at least 1 Amp at the mobile device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to docks for a mobile device. The present invention is also directed to a dock for a mobile device that allows simultaneous data transfer and host level charging and systems and methods using the dock.

Figure 1:
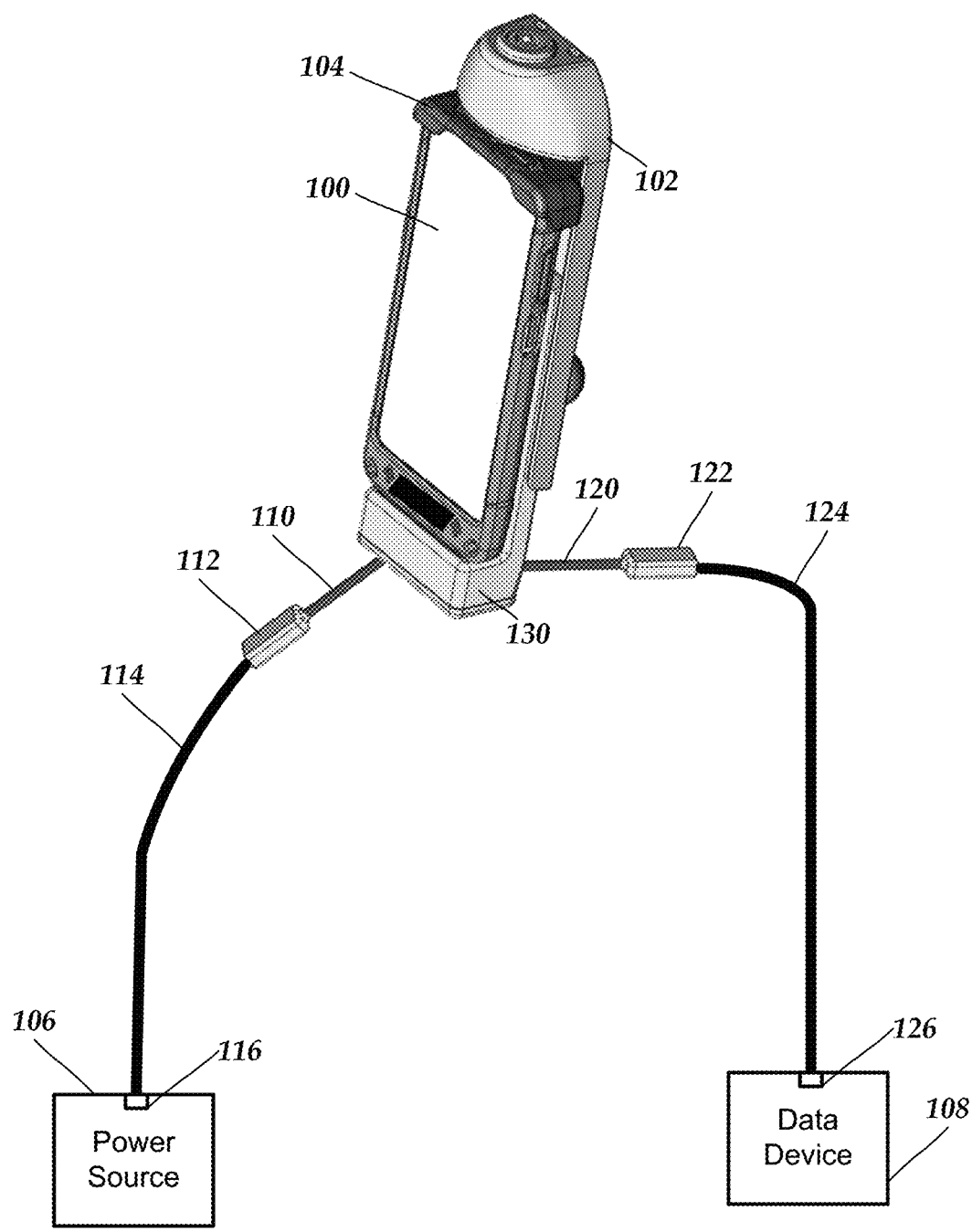
FIG. 1 is a schematic perspective view of one embodiment of a mobile device docking system, according to the invention.

Docks (including docking stations or cradles) can be used to protect the mobile device and to mount the mobile device onto a surface or object. FIG. 1 illustrates one embodiment of a dock 102 (such as a cradle, docking station, or any suitable dock), a mobile device 100 that is removably received by the dock, a power source 106, and a data device 108. The dock 102 is coupled, or coupleable, to the power source 106 using an optional first dock cable 110, power source connector 112, power cable 114, and optional power connector 116. The dock 102 is coupled, or coupleable, to the data device 108 using an optional second dock cable 120, data device connector 122, data cable 124, and optional data connector 126. The power connector 116 and the data connector can be any suitable type of connector including, but not limited to, any type of USB connector, a set of contacts (for example, round contacts, pins, pogo pins, or the like, such as contacts 133 in FIG. 3B), a Lightning connector, a Deutsch connector, a HSD connector, any other suitable proprietary or non-proprietary connector, or the like.

The mobile device 100 can be any suitable mobile device including, but not limited to, a smartphone, cellular or mobile phone, tablet, personal data assistant, laptop computer, or the like. In at least some embodiments, the mobile device 106 has a USB 3.1 or USB Type C connector for coupling to external devices, such as the dock 102. It will be understood that the present invention is applicable to other types of connectors including, but not necessarily limited to, other types of connectors that operate in the same manner as the USB 3.1 or USB Type C connectors, as described below.

Figure 2A:
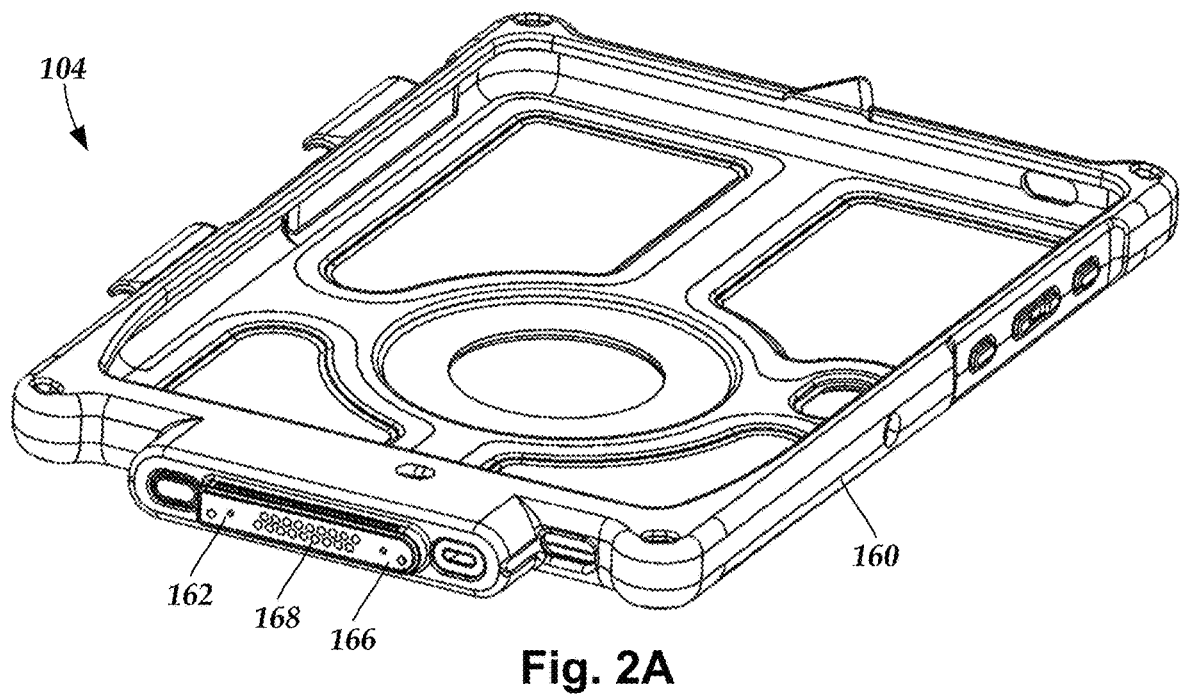
FIG. 2A is a schematic perspective view of one embodiment of a cover for a mobile device.
Figure 2B:
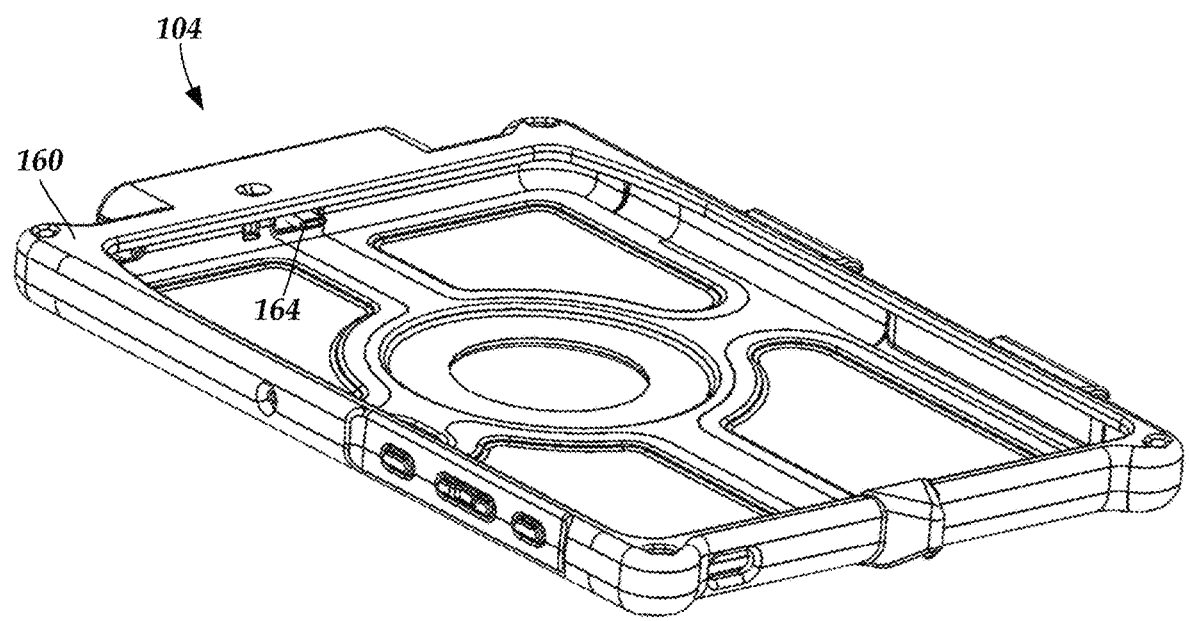
FIG. 2B is schematic perspective view of the cover of FIG. 2B from a different angle.

In at least some other embodiments, the mobile device 106 is disposed, or disposable, in a cover 104 with a flexible shell 160 for receiving and holding the mobile device. One embodiment of a cover 104 is illustrated in FIGS. 2A and 2B. In at least some embodiments, the cover 104 includes an adapter 162 that has a connector 164 (FIG. 2B) of a type compatible with the connector on the mobile device for coupling the adapter to the mobile device. The adapter 162 also includes a contactor 166 with contacts 168 for coupling to the mobile device connector 132 (which, at least in some embodiments, does not correspond to the connector type of the mobile device) of the dock 102. Examples of covers 104 for a mobile device 106 are described in U.S. Pat. Nos. 9,195,279; 9,331,444; 9,529,387; 9,602,639; 9,632,535; 9,706,026; 10,389,399; 10,050,658; 10,054,984; 10,454,515; 10,630,334; 10,666,309; 10,778,275 10,812,643; 11,029,731; 11,076,032; 11,165,458; 11, 277,506; and 11,289,864 and U.S. Patent Applications Publication Nos. 2021/0391678 and 2021/0392773, all of which are incorporated herein by reference in their entireties. It will be understood that covers without an adapter can also be used.

Any suitable dock can be used or adapted, as described below, for use with a mobile device and provide simultaneous data transfer and host level charging (e.g., charging with a current of at least 1, 1.25, 1.5, or 1.65 Amps at the mobile device.) Examples of docks 102 for a mobile device 106 that can be adapted to include the additional components presented herein are described in U.S. Pat. Nos. 7,017,243; 9,602,639; 9,831,904; 10,812,643; 11,029,731; 11,076,032; 11,277,506; and 11,289,864 and U.S. Patent Applications Publication Nos. 2021/0194256; 2021/0391678; and 2021/0392773, all of which are incorporated herein by reference in their entireties.

Figure 3A:
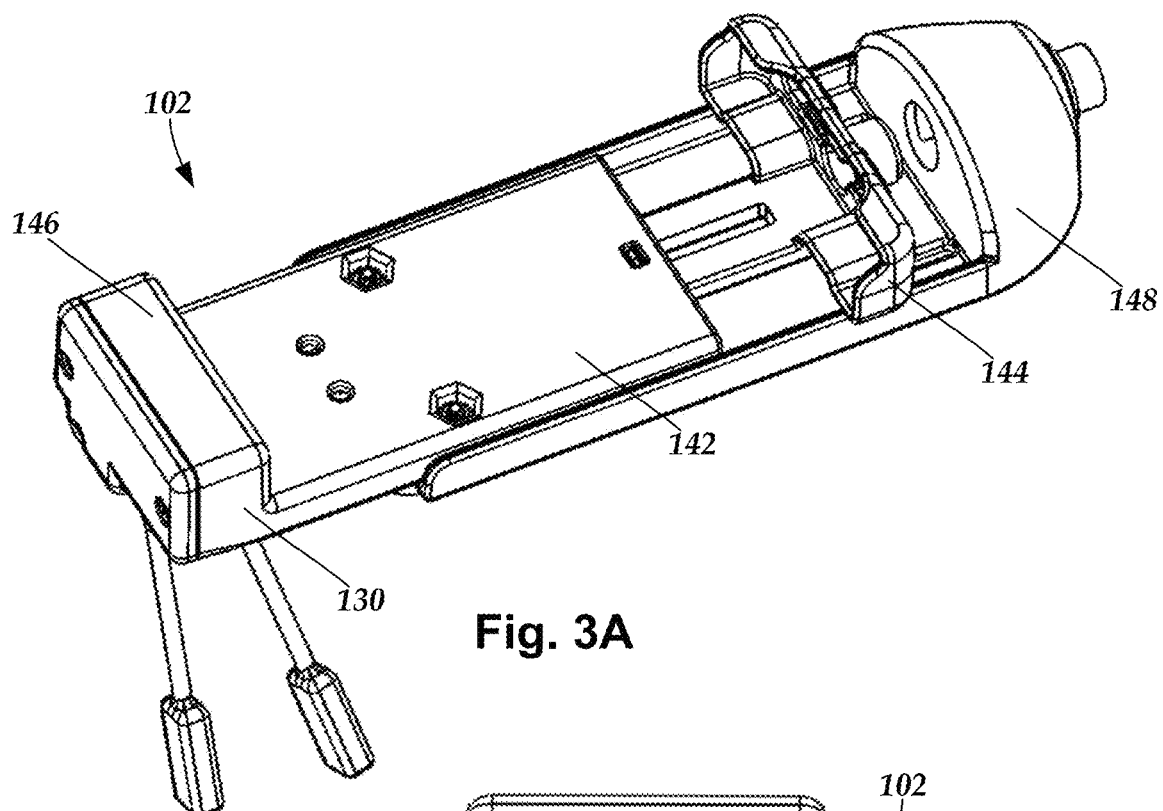
FIG. 3A is a schematic perspective view of one embodiment of a dock, according to the invention.
Figure 3B:
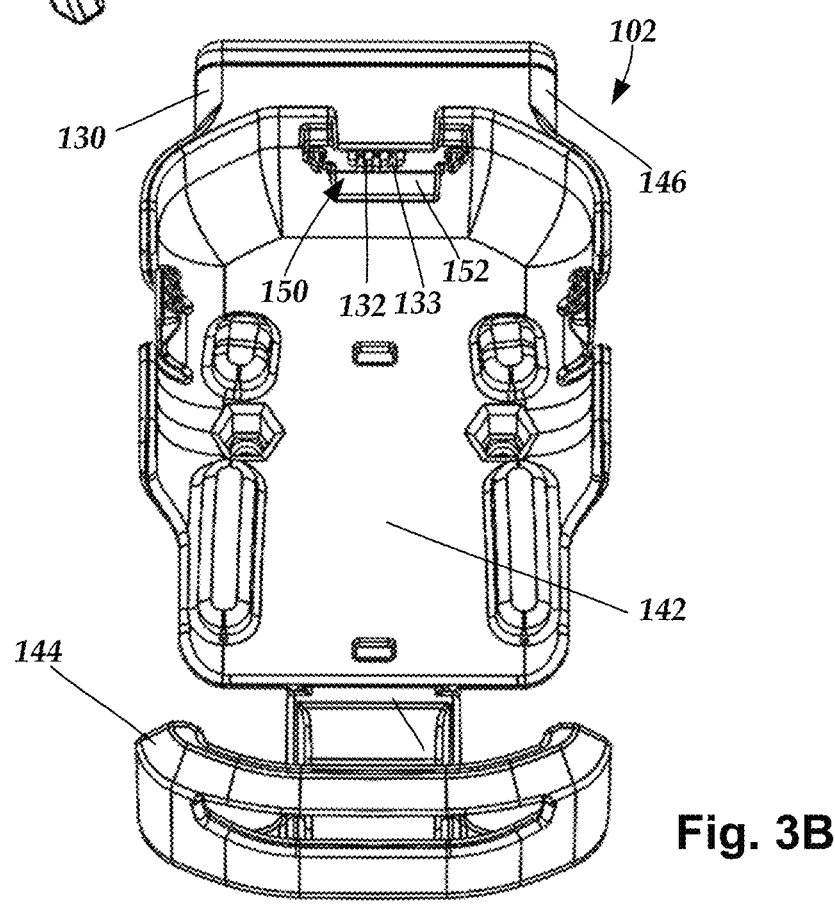
FIG. 3B is a schematic perspective view of another embodiment of a dock, according to the invention.

FIGS. 3A and 3B illustrates two embodiments of a dock 102. In at least some embodiments, the dock 102 includes a base 142, a top device receiver 144 for receiving a top portion of the mobile device, a bottom device receiver 146 coupled to the cradle base 102, a housing 130, and a mobile device connector 132 that includes contacts 133. In at least some embodiments, the top device receiver 144 is movable (for example, slidable) relative to the base 142 to facilitate receiving or removing the mobile device and, in at least some embodiments, may also allow for use with mobile devices of varied sizes. In at least some embodiments, the top device receiver 144 is biased toward the base 142 (using, for example, a spring or the like) to hold the mobile device in the dock 102. In at least some embodiments, the bottom device receiver 146 includes a recess 150 defined by a rim 152, as illustrated in FIG. 3B.

In at least some embodiments such as the embodiment illustrated in FIG. 3A, the dock 102 includes a locking mechanism 148 is coupled to the base tray 104. In at least some embodiments, an optional mount is coupled or coupleable to the dock 102. Non-limiting examples of mounts can be found at U.S. Pat. Nos. 5,845,885; 6,561,476; 7,320,50; 7,997,554; 8,454,178; 8,505,861; 9,831,904; RE42,060; RE42,581; and RE43,806, all of which are incorporated herein by reference in their entireties.

The power source 106 can be any suitable source of power including, but not limited to, a battery, a power outlet (for example, any suitable power outlet such as found in buildings, vehicles, or elsewhere), a vehicle (for example, a car, truck, motorcycle, boat, or airplane), or the like.

The data device 108 can be a computer, a vehicle (for example, a computer or processor in the vehicle), a DVR (digital video recorder), a gateway, a hub, a router, a server, or the like. In at least some embodiments, the data device 108 is wirelessly coupled (for example, using Wi-Fi, Bluetooth™, cellular transmission, or the like) to a receiver or transceiver that is then coupled by wire, cable, or the like to the dock 102.

Figure 4:
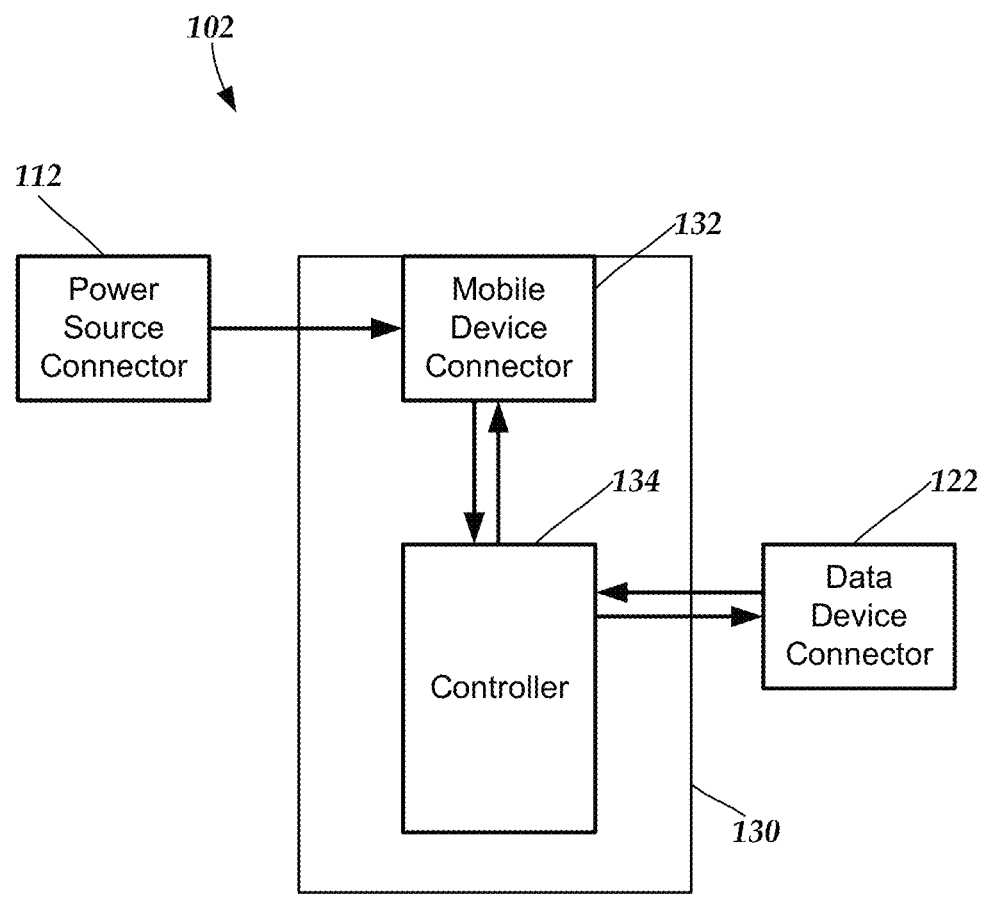
FIG. 4 is a schematic block diagram of a portion of a dock including a mobile device connector, power source connector, data device connector and controller, according to the invention.

FIG. 4 schematically illustrates one embodiment of a connector and controller arrangement for the dock 102. The dock includes a housing 130 (see, also FIGS. 3A and 3B) within which a controller 134 (for example, a USB controller) is disposed. As an example, the controller 134 can be a FE1.1s USB 2.0 High Speed 4-Port Hub Controller although other controllers, such as other USB hub controllers, can also be used.

A mobile device connector 132 is at least partially disposed within, and exposed at, the housing 130 for coupling the mobile device 100 (FIG. 1) to the dock 102 for data transfer and power supply. The mobile device connector 132 (see also, FIG. 3B) can be any suitable type of connector including, but not limited to, any type of USB connector, a set of contacts (for example, round contacts, pins, pogo pins, or the like, such as contacts 133 in FIG. 3B), a Lightning connector, a Deutsch connector, a HSD connector, any other suitable proprietary or non-proprietary connector, or the like. In at least some embodiments, the contacts 133 are biasing contacts, such as biasing pogo pins or biasing leaf springs, which can move up or down in the bottom device receiver 146 (FIG. 3B).

In at least some embodiments, the mobile device connector 132 corresponds to a connector type compatible with a connector on the mobile device 100. In at least some other embodiments, the mobile device 106 is disposed in a cover 104 (FIGS. 2A and 2B) that includes an adapter 162 (FIGS. 2A and 2B) that has a connector 164 (FIGS. 2A and 2B) of a type compatible with the connector on the mobile device for coupling the adapter to the mobile device. The adapter 162 (FIGS. 2A and 2B) also includes a contactor 166 (FIGS. 2A and 2B) with contacts 168 (FIGS. 2A and 2B) for coupling to the mobile device connector 132 (which, at least in some embodiments, does not correspond to the connector type of the mobile device) of the dock 102.

As an example, in at least some embodiments, the mobile device 106 utilizes a USB 3.1 or USB Type C connector that couples to a dock 102 for receiving power from the power source 106 and for transferring data to/from the data device 108. In at least some of these embodiments, the mobile device connector 132 is a corresponding USB 3.1 or USB Type C connector. In at least some other embodiments, the mobile device 106 is disposed in a cover 104 (FIGS. 2A and 2B) that includes an adapter 162 (FIGS. 2A and 2B) that has a corresponding USB 3.1 or USB Type C connector 164 (FIGS. 2A and 2B) for coupling to the mobile device 106 and a contactor 166 (FIGS. 2A and 2B) with contacts 168 (FIGS. 2A and 2B) for coupling to the mobile device connector 132 (which, at least in some embodiments, is not a USB 3.1 or USB Type C connector.)

For example, the contactor 162 (FIGS. 2A and 2B) can include ring contacts 168 (FIGS. 2A and 2B) arranged in one or two rows for coupling to the mobile device connector 132 with ring contacts, pin contacts, or pogo pin contacts, such as contacts 133 in FIG. 3B.

Returning to FIG. 4, the power source connector 112 and the data device connector 122 in the illustrated embodiment are disposed outside of the housing 130 and coupled via the first and second dock cables 110, 120 (FIG. 1). In other embodiments, one or both of the power source connector 112 or data device connector 122 can be at least partially disposed within, and exposed at, the housing 130 (similar to the mobile device connector 132 illustrated in FIG. 4) which may eliminate one or both of the first and second dock cables 110, 120 (FIG. 1).

The power source connector 112 is electrically coupled to the mobile device connector 132 to provide power from the power source 106 to a mobile device 100 coupled to the dock 102. In at least some embodiments, the power source connector 112 is not electrically coupled to the controller 134, as illustrated in FIG. 4.

The data device connector 122 is electrically coupled to the controller 134 which is, in turn, electrically coupled to mobile device connector 132. The controller 134 facilitates the transfer of data between the data device 108 and the mobile device 100 via the data device connector 122 and the mobile device connector 132.

In this arrangement, the data device 108 and mobile device 100 can form a host/client connection via the dock 102 using the controller 134, data device connector 122, and mobile device connector 132. The power source 106 and the mobile device 100 form a second connection for power supply via the dock 102 using the power device connector 112 and the mobile device connector 132. This arrangement can facilitate the mobile device 100 being in a client relationship with respect to the data device 108, which is the host, while allowing host level charging of the mobile device 100 by the power source 106 (for example, using a current of at least 1, 1.25, 1.5, or 1.65 Amps at the mobile device).

Figure 5A:
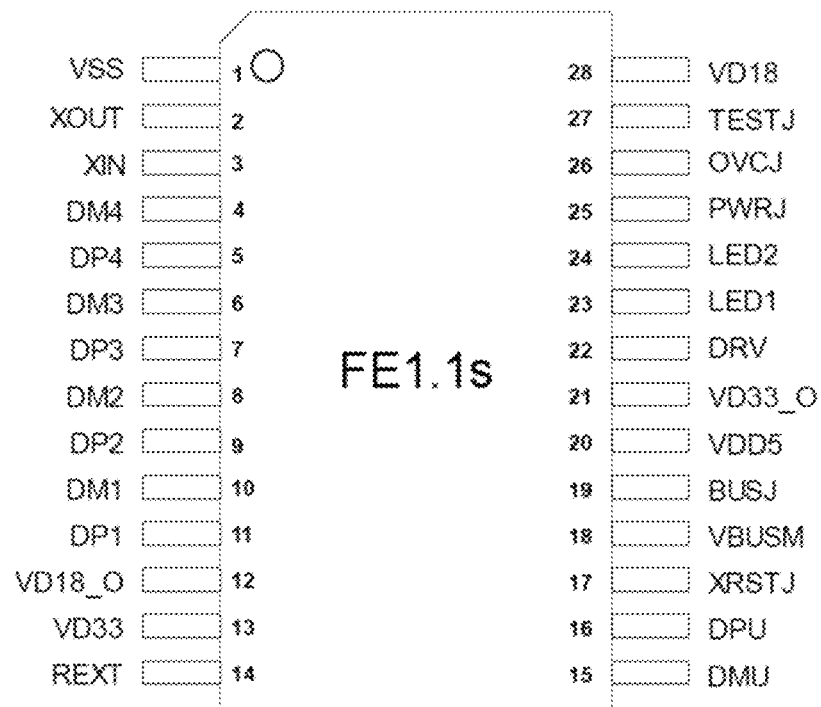
FIG. 5A is a schematic pin diagram of one embodiment of a controller (e.g., a FE1.1s USB 2.0 High Speed 4-Port Hub Controller in SSOP28 packaging)
Figure 5B:
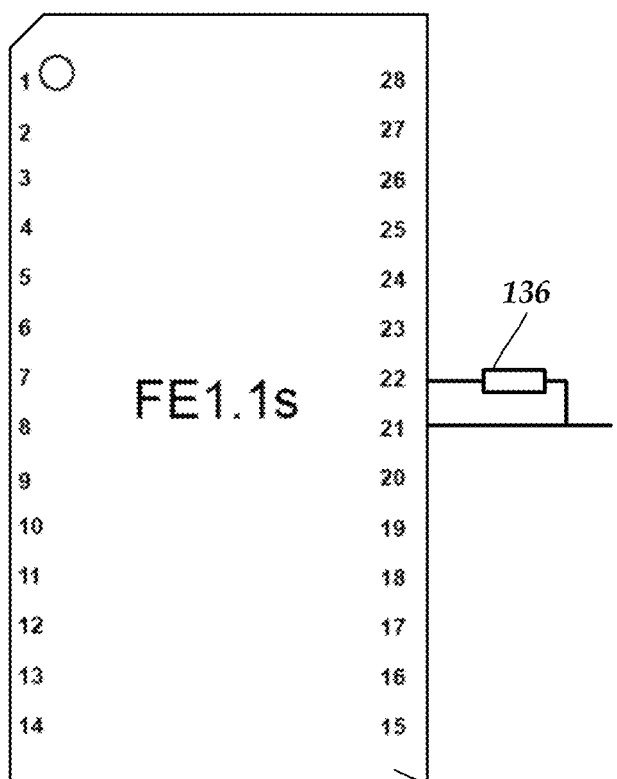
FIG. 5B is a schematic diagram of the controller with a resistor coupled to pin 22 of the controller, according to the invention.

In at least some embodiments, the dock 102 allow for the establishment of a DCP (dedicated charging port) role between the mobile device 100 and the power source 106. In at least some embodiments, this DCP role is facilitated by a modification of the controller 134 circuitry. FIG. 5A illustrates one example of a pin assignments for FE1.1s USB 2.0 High Speed 4-Port Hub Controller in SSOP28 packaging. FIG. 3B illustrates a modification of the circuitry electrically coupled to the controller 134. In this modification, a resistor 136 (for example, a 1 kΩ resistor) is coupled to pin 22 (DRV-LED drive control). In at least some embodiments, the resistor 136 is coupled between pin 22 and pin 21 (VD33_O-3.3V power output) of the controller 134, as illustrated in FIG. 5B. It will be understood that a similar modification can be made for other types of packaging of the controller 134 or other types of controllers 134.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A dock configured to receive a mobile device, the dock comprising:
   a dock housing;
   a mobile device connector disposed at least partially within the dock housing and configured for electrically coupling to a single connector of a mobile device received in the dock;
   a power source connector configured for coupling a power source to the dock, wherein the power source connector is electrically coupled to the mobile device connector;
   a dock controller within the dock housing, with or without the mobile device received in the dock, and configured for facilitating data transfer between the mobile device and a data device, wherein the dock controller is electrically coupled to the mobile device connector;

a data device connector configured for coupling the data device to the dock, wherein the data device connector is electrically coupled to the dock controller;

wherein the dock controller, data device connector, power source connector, and mobile device connector are configured for simultaneously providing through the same mobile device connector (i) data transfer between the mobile device and the data device and (ii) a charging current to the mobile device using the power source, wherein the dock is configured so that the charging current received by the mobile device is at least 1 Amp.

2. The dock of claim 1, wherein the power source connector is not electrically coupled to the dock controller.

3. The dock of claim 1, wherein the dock controller has a LED driver control pin and at least one LED pin, separate from the LED driver control pin, and the dock further comprises a resistor directly and electrically coupled to the LED driver control pin.

4. A dock configured to receive a mobile device, the dock comprising:
   a dock housing;
   a mobile device connector disposed at least partially within the dock housing and configured for electrically coupling to a mobile device received in the dock;
   a power source connector configured for coupling a power source to the dock, wherein the power source connector is electrically coupled to the mobile device connector;
   a dock controller within the dock housing, with or without the mobile device received in the dock, and configured for facilitating data transfer between the mobile device and a data device, wherein the dock controller is electrically coupled to the mobile device connector, wherein the dock controller has a LED driver control pin; at least one LED pin, separate from the LED driver control pin; and a 3.3 voltage power output pin;
   a resistor directly and electrically coupled to the LED driver control pin, wherein the LED driver control pin is directly and electrically coupled to the 3.3 voltage power output pin through the resistor
   a data device connector configured for coupling the data device to the dock, wherein the data device connector is electrically coupled to the dock controller;
   wherein the dock controller, data device connector, power source connector, and mobile device connector are configured for simultaneously providing data transfer between the mobile device and the data device and providing a charging current to the mobile device using the power source, wherein the dock is configured so that the charging current received by the mobile device is at least 1 Amp.

5. The dock of claim 1, further comprising a first dock cable extending from the dock housing and coupled to the power source connector.

6. The dock of claim 1, further comprising a second dock cable extending from the dock housing and coupled to the data device connector.

7. The dock of claim 1, wherein the dock controller is a USB port hub controller.

8. The dock of claim 1, wherein the mobile device connector is any type of USB connector.

9. The dock of claim 1, wherein the mobile device connector is not a USB connector.

10. A mobile device docking system, comprising
    the dock of claim 1; and
    the mobile device receivable in the dock, the mobile device comprising a connector electrically coupleable to the mobile device connector of the dock.

11. The mobile device docking system of claim 10, further comprising the power source coupleable to the power source connector of the dock.

12. The mobile device docking system of claim 10, further comprising the data device coupleable to the data device connector of the dock.

13. The mobile device docking system of claim 10, wherein the mobile device connector is a type of connector that is directly connectable to the connector of the mobile device.

14. The mobile device docking system of claim 10, further comprising a cover, wherein the mobile device is receivable within the cover.

15. The mobile device docking system of claim 14, wherein the cover comprises an adapter, the adapter comprising a connector configured for electrically connecting to the connector of the mobile device and a contactor having contacts disposed thereon and configured for electrically connecting to the mobile device connector of the dock.

16. The mobile device docking system of claim 15, wherein the mobile device connector is a type of connector that is not directly connectable to the connector of the mobile device.

17. The mobile device docking system of claim 15, wherein the connector of the adapter of the cover and the connector of the mobile device are USB connectors.

18. A method of using a mobile device, the method comprising:
    receiving the mobile device in the dock of claim 1;
    coupling the data device to the data device connector of the dock; and
    transferring data between the data device and the mobile device through the mobile device connector using the dock controller.

19. The method of claim 18, further comprising
    coupling the power source to the power source connector of the dock; and
    charging the mobile device via the dock using the same mobile device connector and the power source.

20. The method of claim 19, further comprising simultaneously transferring the data between the data device and the mobile device using the dock controller and charging the mobile device via the dock using the power source with the charging current of at least 1 Amp at the mobile device.

* * * * *